(12) United States Patent
Ho et al.

(10) Patent No.: US 9,509,364 B2
(45) Date of Patent: Nov. 29, 2016

(54) INTEGRATED ANTENNA UNIT WITH FIELD REPLACEABLE FREQUENCY SPECIFIC DEVICES

(71) Applicant: Amphenol Antenna Solutions, Inc., Rockford, IL (US)

(72) Inventors: Jimmy Ho, Hickory, NC (US); Jeffrey Sierzenga, Conover, NC (US); Chengcheng Tang, South Tsimshatsu Kin (HK); Eric B. Berry, Connelly Springs, NC (US); Jeffrey J. Liu, The Hague (NL)

(73) Assignee: Amphenol Antenna Solutions, Inc., Rockford, IL (US)

( * ) Notice: Subject to any disclaimer, the term of this patent is extended or adjusted under 35 U.S.C. 154(b) by 0 days.

(21) Appl. No.: 14/872,982

(22) Filed: Oct. 1, 2015

(65) Prior Publication Data

US 2016/0099745 A1    Apr. 7, 2016

Related U.S. Application Data

(60) Provisional application No. 62/058,367, filed on Oct. 1, 2014.

(51) Int. Cl.
  *H04M 1/00* (2006.01)
  *H04B 1/50* (2006.01)
  *H04B 3/03* (2006.01)
  *H04W 88/08* (2009.01)

(52) U.S. Cl.
  CPC ........ *H04B 1/50* (2013.01); *H04B 3/03* (2013.01); *H04W 88/08* (2013.01)

(58) Field of Classification Search
  CPC .... H01Q 1/242; H01Q 1/243; H01Q 1/2275; H01Q 1/244; H01Q 21/28; H01Q 1/2266; H01Q 1/46; H01Q 1/081; H01Q 1/1271; H01Q 1/2258; H01Q 1/3291; H01Q 9/30; H04B 1/719; H04B 5/0012; H04B 1/3877; H04B 5/0037; H04B 1/0057
  USPC ......................................................... 455/562
  See application file for complete search history.

(56) References Cited

U.S. PATENT DOCUMENTS

| 4,030,797 | A | | 6/1977 | Nieman | |
|---|---|---|---|---|---|
| 4,815,986 | A | | 3/1989 | Dholoo | |
| 4,891,743 | A | * | 1/1990 | May | G01R 31/40 363/87 |
| 5,832,237 | A | * | 11/1998 | Lee | G06F 13/4081 710/303 |
| 8,149,224 | B1 | * | 4/2012 | Kuo | G06F 1/1626 345/156 |
| 8,358,121 | B2 | * | 1/2013 | Hudson | G01R 15/125 324/115 |
| 8,494,878 | B2 | * | 7/2013 | Stevens | G06Q 30/02 340/5.61 |
| 8,917,235 | B2 | * | 12/2014 | Orsley | G06F 1/1616 345/156 |
| 2005/0048848 | A1 | | 3/2005 | Axenbock et al. | |
| 2010/0189126 | A1 | * | 7/2010 | Lurie | H04W 8/24 370/445 |

(Continued)

OTHER PUBLICATIONS

International Search Report for PCT/US2015/053573 dated Dec. 22, 2015, 3 pages.

(Continued)

*Primary Examiner* — Ajibola Akinyemi
(74) *Attorney, Agent, or Firm* — Blank Rome LLP

(57) ABSTRACT

An integrated antenna unit, including an extra-wideband antenna, a docking station, and an integrated, field replaceable remote radio unit that electrically couples to the docking station. The docking station may be configured to receive a removable transmission circuit that that electrically couples the remote radio unit and the antenna.

21 Claims, 13 Drawing Sheets

(56) References Cited

U.S. PATENT DOCUMENTS

| | | | |
|---|---|---|---|
| 2010/0297867 A1 | 11/2010 | Rosenberger | |
| 2011/0279337 A1* | 11/2011 | Corwin | H01Q 1/088 343/713 |
| 2012/0035426 A1 | 2/2012 | Mielcarz et al. | |
| 2012/0293391 A1* | 11/2012 | Simmons | H01Q 1/007 343/859 |
| 2013/0021118 A1 | 1/2013 | Yeates | |
| 2013/0065415 A1 | 3/2013 | Van Swearingen et al. | |
| 2014/0179244 A1 | 6/2014 | Colapietro et al. | |
| 2014/0218255 A1 | 8/2014 | Sanford et al. | |
| 2015/0126120 A1* | 5/2015 | Chen | H04B 1/0057 455/41.2 |
| 2015/0147978 A1* | 5/2015 | Davis | G06F 1/1632 455/73 |

OTHER PUBLICATIONS

Written Opnion for PCT/US2015/053573 dated Dec. 22, 2015, 9 pages.

White, P., "New antenna techniques can breathe new life into macro networks", Jan. 22, 2012, http://www.rethinkresearch.biz/articles/new-antenna-techniques-can-breathe-new-life-into-macro-networks/.

"MWC 2014 Preview: Commscope unveils plug and play standards interface at top of cell tower", Feb. 12, 2014, http://www.wireless-mag.com/News/28207/mwc-2014-preview-commscope-unveils-plug-and-play-standard-interface-at-top-of-cell-tower.aspx#.Vg0uKbQweDo.

Vincent, M., CommScope simplifies base station antenna, RRU interface for easier cell tower upgrades, Feb. 13, 2014, http://www.cablinginstall.com/articles/2014/02/commscope-andrew-siterise-interface.html.

"CommScope crafts a total package for FFTA, remote radio depolyments", Jul. 17, 2013, http://www.businesswire.com/news/home/20130717005054/en/CommScope-Crafts-Total-Package-FTTA-Remote-Radio#.Vg0lXLQweDo.

"How to spot sprint antennas and RRUs (Samsung)", May 30, 2013, http://s4gru.com/index.php?/topic/3906-how-to-spot-sprint-antennas-and-rrus-samsung/.

International Search Report for PCT/US2015/053519 dated Jan. 14, 2016 (5 pages).

* cited by examiner

INTEGRATED ANTENNA UNIT WITH FIELD REPLACEABLE FREQUENCY SPECIFIC DEVICES

CROSS REFERENCE TO RELATED APPLICATIONS

This application claims priority to U.S. Prov. Appl. No. 62/058,367, filed Oct. 1, 2014, the entirety of which is hereby incorporated by reference.

BACKGROUND

This disclosure relates generally to an integrated antenna unit and more specifically to an antenna unit with an integrated and replaceable remote radio unit.

Conventional antenna systems include an antenna mounted on a supporting tower and a base station at ground level (or sometimes on a rooftop). The base station and the antenna are connected together using coaxial cables, often 100 ft. or more in length. Because of advances in technology, the radio equipment in the base station has become smaller and consumes less power. Therefore, in order to reduce signal loss caused by the coaxial cables (that can be as much as 3 dB, or 50% of the signal power), some conventional antenna systems include a remote radio unit that is mounted on the supporting tower.

A remote radio unit may be fed using an optical fiber line, which conveys the digital input/output signals. The remote radio unit may include modulation circuits that impress the digital information on a radio frequency carrier signal, amplifiers that increase the power of radio frequency signal to the desired level for transmission, etc. In the receive direction, the remote radio unit may include circuits to amplify the incoming signal, demodulate the signal to extract the digital data it was carrying, and circuits to couple the demodulated signal to the optical fiber line.

FIG. 1 is a block diagram illustrating a prior art antenna system, including an extra-wideband antenna 11, a transmission circuit 10, and at least one remote radio unit 2 connected to the antenna by jumper cables 101 and 102. The jumper cables may be coaxial cables with threaded ring connectors. This example is typical of prior art installations in which the antenna 11 receives two radio mobile radio services. One mobile radio service is provided by radio equipment located remotely from the antenna unit via a coaxial cable 100 and a second mobile radio service is provided to the remote radio unit 2 by ground-level equipment via a signal/power line 103, which may include optical fiber lines. The antenna 11 is capable of transmitting/receiving radio signals over a wide band while the remote radio unit 2 operates over specific narrower frequency bands.

In response to changes in spectrum management or radio access technology, the prior art antenna system illustrated in FIG. 1 allows an operator to remove and replace the remote radio unit 2. The prior art antenna system, however, has a number of drawbacks. Connecting the remote radio unit 2 to the antenna 11 using the jumper cables 101 and 102 increases installation time and introduces losses to the system.

Other prior art antenna systems integrate the remote radio unit 2 within the antenna 11. An integrated remote radio unit 2 and antenna 11 is aesthetically pleasing and eliminates the need for jumper cables. In order to respond to changes in spectrum management or radio access technology, however, an integrated remote radio unit 2 and antenna 11 must be completely replaced at considerable expense.

Accordingly, there is a need for an integrated antenna unit including an extra-wideband antenna and an integrated, field replaceable remote radio unit.

SUMMARY

Exemplary embodiments are provided, including an integrated antenna unit having an extra-wideband antenna, a docking station, and an integrated, field replaceable remote radio unit that electrically couples to the docking station. The docking station may be configured to receive a removable transmission circuit that that electrically couples the remote radio unit and the antenna.

DETAILED DESCRIPTION

A typical base station antenna supports operation using two signal polarizations, usually +45° and −45° linear polarizations. Identical mirror-image arrangements internal to the antenna are associated with each polarization and an input connection is provided for each polarization. Similarly, many remote radio units (also referred to as remote radio heads) and tower-mounted amplifiers support two polarizations and are provided with two output connections. For the sake of clarity the identical arrangements for a second polarization are not shown in any of FIGS. 1-10 unless noted otherwise.

Base stations, antennas, and remote radio units support both the transmission and reception of radio signals. To avoid unnecessary complexity in description, the transmit signal direction is referred to throughout the following descriptions, but it is to be understood that all components and interfaces support both transmitted and received signals.

Figure 1:
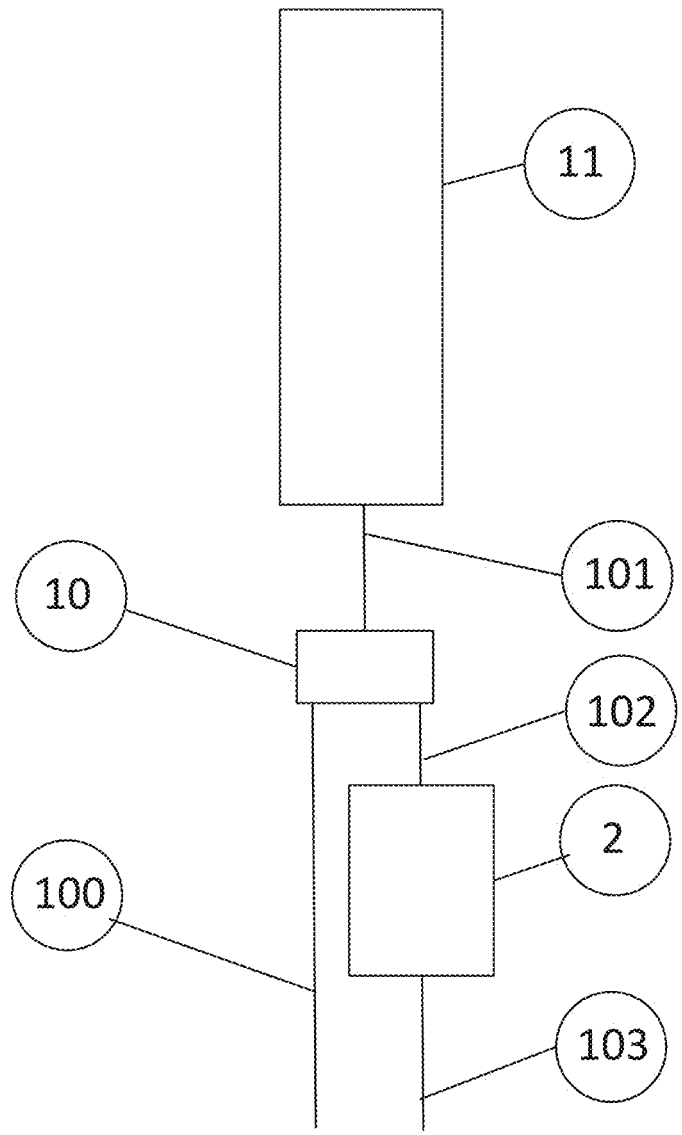
FIG. 1 is a block diagram illustrating a prior art antenna system.
Figure 2:
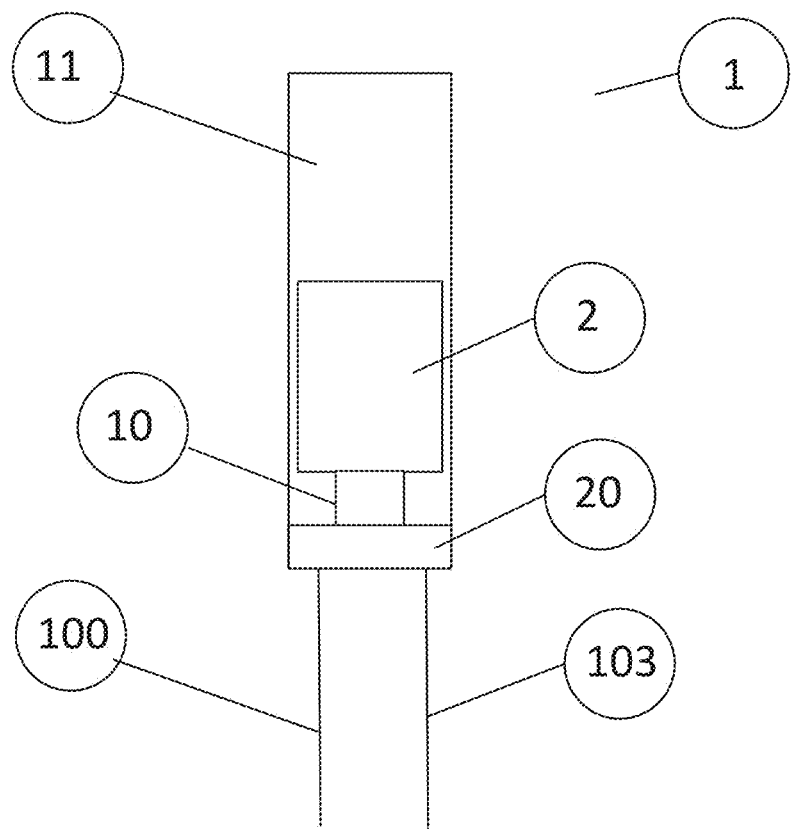
FIG. 2 is a block diagram illustrating an integrated antenna unit according to an exemplary embodiment of the present invention.

FIG. 2 is a block diagram illustrating an integrated antenna unit 1 according to an exemplary embodiment of the present invention. The integrated antenna unit 1 includes an extra-wideband antenna 11, a docking station 20, at least one remote radio unit 2, and transmission circuit 10. The transmission circuit may be a diplexer that combines signals in different operating frequency bands. For example, the diplexer may combine radio frequency signals provided to the antenna 11 by remote radio equipment via, for example, a coaxial cable 100 and radio frequency signals provided by the integrated remote radio unit 2, which is fed, for example, via an optical fiber 103.

Because the extra-wideband antenna 11 is capable of transmitting/receiving radio signals over most or all allocated radio frequencies across the globe, the antenna 11 can migrate to a new frequency band by simply replacing the remote radio unit 2. Similarly, if new radio technology is required, a new remote radio unit 2 may add additional hardware elements to the existing antenna 11.

Figure 3:
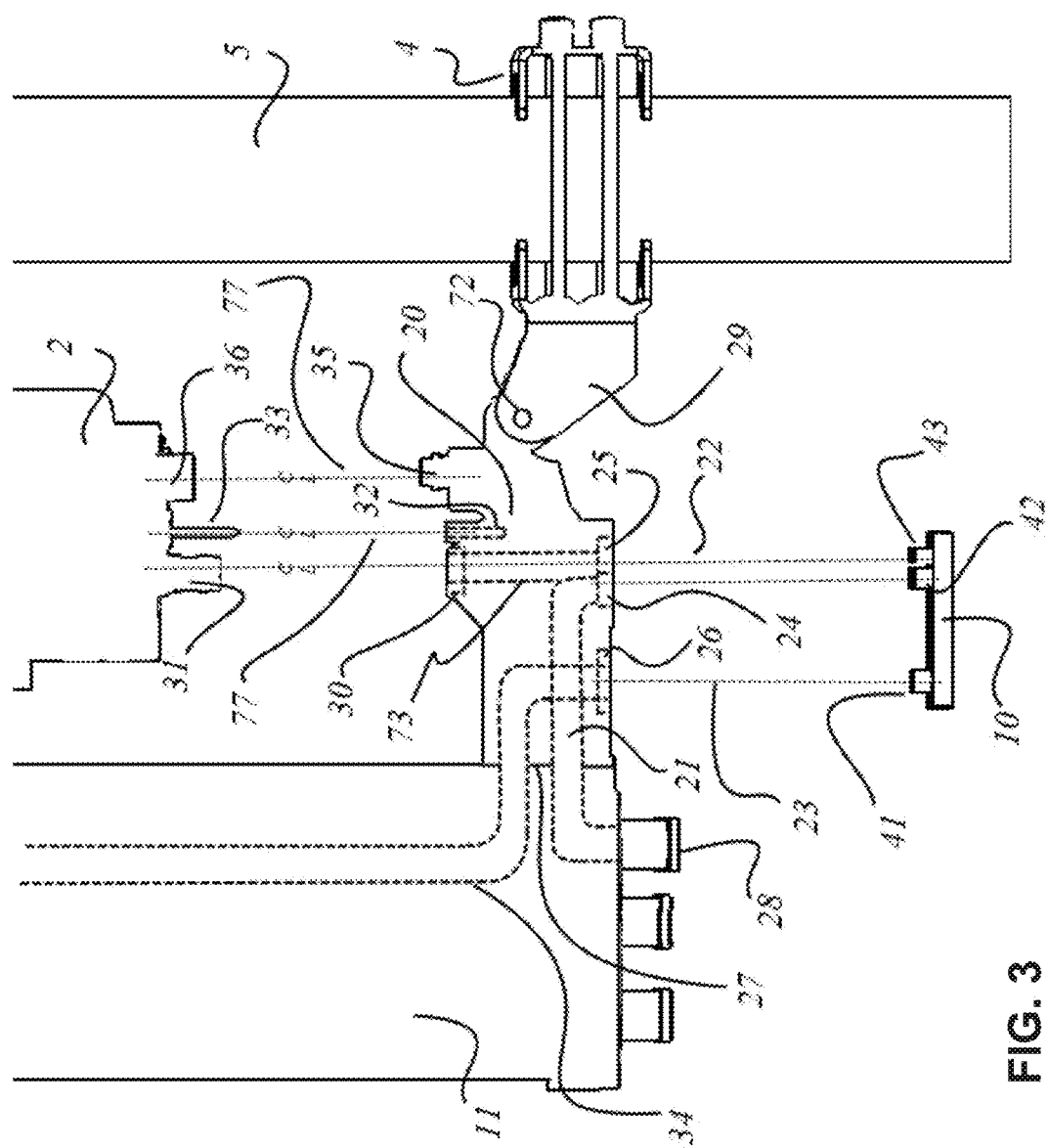
FIG. 3 is a view of the integrated antenna unit illustrated in FIG. 1 according to an exemplary embodiment of the present invention.

FIG. 3 is a view of the integrated antenna unit 1 according to an exemplary embodiment of the present invention. The integrated antenna unit 1 includes the antenna 11, the docking station 20, the remote radio unit 2, and the transmission circuit 10.

The remote radio unit 2 is electrically and mechanically detachable from the integrated antenna unit 1, allowing an operator to migrate the integrated antenna unit 1 to a different frequency band or add additional hardware elements to the antenna 11 by removing and replacing the remote radio unit 2.

The antenna 11 includes a housing that also forms an exterior surface of the docking station 20. The antenna 11 and the docking station 20 may be constructed separately and connected together (such as by a fastening device) or as a single integral mechanical entity. The antenna 11 includes a legacy interface 28 (e.g., a coaxial interface).

The antenna 11 and the docking station 20 include transmission lines 21, 34 and 73 within the housing. The transmission line 34 electrically connects the antenna 11 and the transmission circuit 10, the transmission line 21 electrically connects the legacy interface 28 and the transmission circuit 10, and the transmission line 73 electrically connects the remote radio unit 2 and the transmission circuit 10. The housing includes at least one opening 27 to accommodate the transmission lines 21 and 34. Thus, the transmission circuit 10 electrically couples the remote radio unit 2 to the antenna 11 via the transmission lines 73 and 34 electrically couples the legacy interface 28 and the antenna 11 via the transmission lines 21 and 34.

The remote radio unit 2 mechanically attaches and electrically connects to the docking station 20. The remote radio unit 2 includes a coaxial interface 31, one or more guides 33, and at least one control signal interface 36. The docking station 20 has a box form structure with a mechanical guiding interface on its upper surface that includes a coaxial interface 30, one or more openings 32, and at least one control signal interface 35. Each guide 33 of the remote radio unit 2 engages with a corresponding opening 32 of the docking station 20. The coaxial interface 31 of the remote radio unit 2 engages with and electrically connects to the coaxial interface 30 of the docking station 20. The control signal interface 36 of the remote radio unit 2 engages with and electrically connects to the control signal interface 35 of the docking station 20.

The transmission circuit 10 mechanically engages with and electrically connects to the docking station 20. A lower surface of the docking station 20 includes interfaces 24, 25 and 26. The transmission circuit 10 may include up to three interfaces 41, 42, and 43. The interface 41 of the transmission circuit 10 engages with and electrically connects to the interface 26 of the docking station 20. Accordingly, the interface 41 couples the transmission circuit 10 to the antenna 11 via the interface 26 and the transmission line 34. The interface 42 engages with and electrically connects to the interface 24 of the docking station 20. Accordingly, the interface 42 electrically couples the transmission circuit 10 to the legacy interface 28 via the interface 24 and the transmission line 21. The interface 43 engages with and electrically connects to the interface 25 of the docking station 20. Accordingly, the interface 43 electrically couples the transmission circuit 10 to the remote radio unit 2 via the interface 25, the transmission line 73, and the interfaces 30 and 31.

The transmission circuit 10 may have three different forms and the integrated antenna unit 1 may be capable of three operational modes depending on the form of the transmission circuit 10.

In a first mode, the antenna 11 transmits a signal received via the legacy interface 28 (e.g., via a coaxial cable 100 attached to the legacy interface 28). In this mode, the transmission circuit 10 is a transmission line link electrically connecting the interfaces 24 and 26 of the docking station 20. Accordingly, signals received via the legacy interface 28 are transmitted to the antenna 11 via the transmission line 21, the interfaces 24 and 42, the transmission circuit 10, the interfaces 41 and 26, and the transmission line 34.

In a second mode, the antenna 11 is powered by the remote radio unit 2. In this mode, the transmission circuit 10 is a transmission line link electrically connecting the interfaces 25 and 26 of the docking station 20. Accordingly, signals output by the remote radio unit 2 are transmitted to the antenna 11 via the interfaces 31 and 30, the transmission line 73, the interfaces 25 and 43, the transmission circuit 10, the interfaces 41 and 26, and the transmission line 34.

In a third mode, the transmission circuit 10 is a diplexer that combines the signals received via the legacy interface 28 and the remote radio unit 2. In this mode, the diplexer is electrically connected to the interfaces 24, 25, and 26 of the docking station 20. As described above, signals received via the legacy interface 28 are transmitted to the antenna 11 via the transmission line 21, the interfaces 24 and 42, the diplexer (i.e., transmission circuit 10), the interfaces 41 and 26, and the transmission line 34. As also described above, signals output by the remote radio unit 2 are transmitted to the antenna 11 via the interfaces 31 and 30, the transmission line 73, the interfaces 25 and 43, the diplexer (i.e., transmission circuit 10), the interfaces 41 and 26, and the transmission line 34.

The integrated antenna unit 1 may include additional interfaces and additional transmission circuits 10 (such as diplexers) to accommodate additional electrical connections between the remote radio unit 2 and the antenna 11. For example, a typical embodiment may include four electrical connections to accommodate two signal polarizations in two different radio frequency bands. A typical remote radio unit 2, for example, outputs signals in two polarizations over one frequency band via two interfaces. The integrated antenna unit 1 may include multiple remote radio units that output signals over multiple frequency bands/polarizations as described below. Additionally, future remote radio units may be developed that output signals over two frequency bands in two polarizations (e.g., via four interfaces). As one of ordinary skill in the art will recognize, the integrated antenna unit 1 may be adapted to accommodate any number of remote radio units outputting signals over any number of radio frequency bands/polarizations via any number of interface pairs without departing from the scope of this disclosure.

The transmission circuit 10 may be realized by any suitable technology such as microstrip, coaxial resonators, or ceramic resonators. The transmission lines 21, 34, and 73 may be coaxial transmission lines or may be of planar construction (such as striplines or microstrip lines). In contrast to the jumper cables 101 and 102 of the prior art antenna unit, the transmission lines 21, 34, and 73 of the integrated antenna unit 1 are located within the housing of the antenna 11 and the docking station 20. As described above, jumper cables 101 and 102 that add significant losses to the system. Because the remote radio unit 2 is mounted to the antenna 11 and electrically and mechanically connected to the docking station as discussed herein, the integrated antenna unit 1 allows the transmission lines 21, 34, and/or 73 to be significantly shorter than the prior art jumper cables 101 and 102. Furthermore, because the transmission lines 21, 34, and 73 are permanently installed within the housing of the antenna 11 and the docking station 20, the transmission lines 21, 34, and 73 do not need to be as flexible as the prior art jumper cables 101 and 102 to electrically couple to the hardware elements as described herein. Accordingly, the transmission lines 21, 34, and 73 introduce less loss than the jumper cables 101 and 102.

The interface pairs 26 and 41, 24 and 42, 25 and 43, 30 and 31 and 35 and 36 may be any suitable connector such as those described in U.S. Prov. Pat. Appl. No. 62/166,931 and the utility patent application claiming priority thereto, which are both hereby incorporated by reference. The interface pairs are preferably push-fit blind mate connectors that provide secure electrical connections by the action of pushing the connector interfaces into intimate contact while allowing for a degree of mechanical tolerance in the exact position and angular alignment between the mating connectors. Accordingly, the remote radio unit 2 may be mechanically and electrically connected to the docking station 20 by pushing the remote radio unit 2 and the docking station 20 together. Similarly, the transmission circuit 10 may be mechanically and electrically connected to the docking station 20 by pushing the transmission circuit 10 and the docking station 20 together.

In contrast to the jumper cables 101 and 102, which increase installation time by requiring an operation to install threaded connection, the integrated antenna unit 1 allows an operator to quickly and easily install/replace a remote radio unit 2 because the interfaces 30 and 35 of the docking station 20 are substantially parallel and mate with the interfaces 31 and 36 of the remote radio unit 2, which are also substantially parallel.

The remote radio unit 2 outputs control signals to the antenna 11 via the interfaces 36 and 35 and an additional transmission line (not shown). The control signals may be standard control signals (e.g., control signals that conform to the specifications of the Antenna Interface Standards Group). For example, the remote radio unit 2 may output control signals and/or power via the control signal interface 36 and the docking station 20 may receive the control signals and/or power via the control signal interface 35. The antenna 11 may include a position controller (not shown) and a motor (not shown) and the docking station 20 may include one or more transmission lines (not shown) that electrically couple the control signal interface 36 and the position controller. The position controller may determine a direction of one or more antenna arrays (not shown) of the antenna 11 and output control signals and/or power to a motor to change the direction (e.g., downtilt) of the one or more antenna arrays.

In the embodiment shown in FIG. 3, the remote radio unit 2 is connected to an upper surface of the docking station 20 and the diplexer 10 is connected to a lower surface of the docking station 20, with center lines 22, 23, 74, 75, 76 and 77 indicating the alignment between related interfaces. As one of ordinary skill in the art would recognize, the physical components described above may be arranged in any manner to obtain an arrangement that is compatible with the design of the remote radio unit 2.

The integrated antenna unit 1 may be secured to a base 29 by way of a hinge pin 72 and the base 29 may be secured to a mounting pole 5 by way of a mounting/clamping device 4 such as a clamp. Additional supporting devices (not shown) may be provided according to the size and weight of the antenna 11. The integrated antenna unit 1 may include additional mechanical linkages (not shown) so that the antenna 11 can be arranged such that it has a mechanical downtilt. Alternatively, the antenna 11 may include phase shifters that provide downtilt via a progressive phase shift over the array.

Figure 4A:
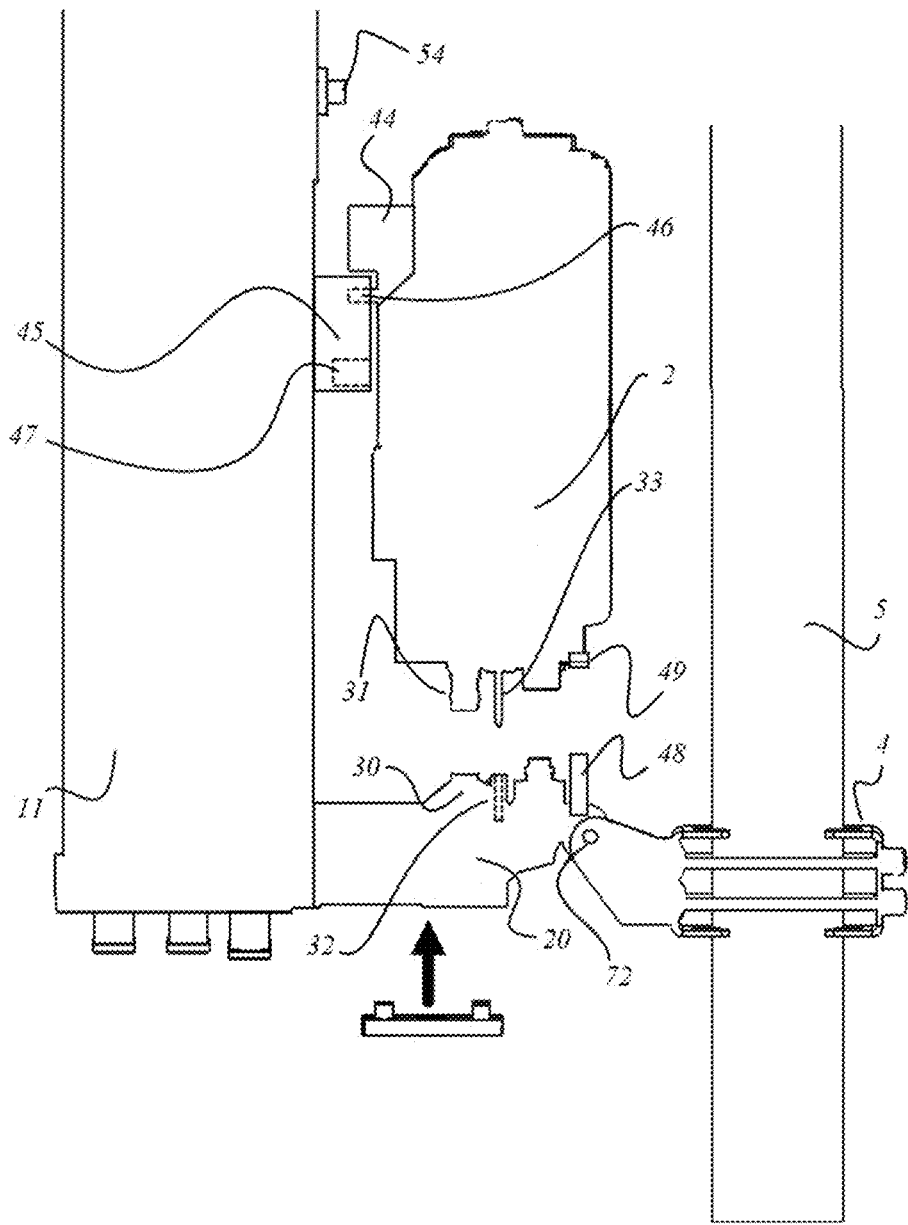
FIG. 4A is a view of the integrated antenna unit illustrated in FIG. 1 according to an exemplary embodiment of the present invention.

FIG. 4A is a view of the integrated antenna unit 1 according to an exemplary embodiment of the present invention. As shown in FIG. 4A, the remote radio unit 2 includes a guide piece 44 and a striker bolt 46 and the antenna 11 includes a guide 45 and a latch 47 (e.g., a rotary latch) the docking station 20 includes one or more latches 48 (e.g., toggle latches) and the remote radio unit 2 includes one or more corresponding latch hooks 49. The antenna 11 may also include an input device 54 (e.g., a button or lever) to release the latch 47.

The guide 45 of the antenna 11 is adapted to accommodate the guide piece 44 of the remote radio unit 2. The remote radio unit 2 is secured to the antenna 11 by sliding the guide piece 44 through the guide 45 (in a downward direction as shown in FIG. 4A) until the latch 47 engages with the bolt 46. The guide pin(s) 33 of the remote radio unit 2 also engage with the opening(s) 32 of the docking station 30 to align the remote radio unit 2 with the docking station 20 as the remote radio unit 2 slides downward.

Figure 4B:
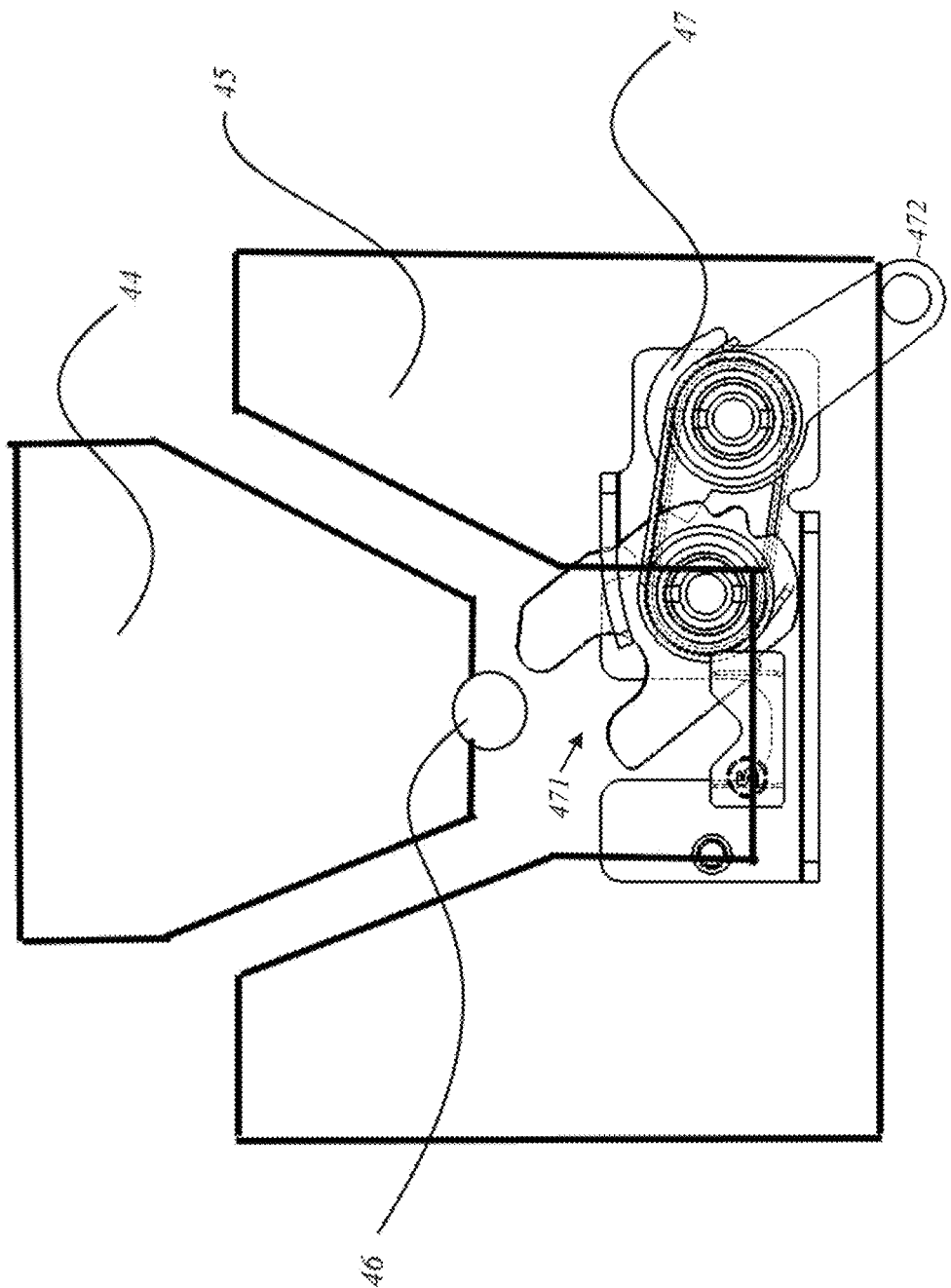
FIG. 4B is a view of the guide piece and the guide illustrated in FIG. 4A according to an exemplary embodiment of the present invention.

FIG. 4B is a view of the guide piece 44 and the guide 45 according to an exemplary embodiment of the present invention. The guide 45 is attached to the antenna 11 and the guide 44 is attached to the remote radio unit 2. (Both the antenna 11 and the remote radio unit 2 are omitted for clarity.) As shown in FIG. 4B, the guide piece 44 may include a bolt 46 and the guide 45 may include a rotary latch 47, which may include with a c-shaped member 471 and a handle 472. As the guide piece 44 engages with the guide 45, the bolt 46 engages with the c-shaped member 471, which moves the handle 472.

Figure 4C:
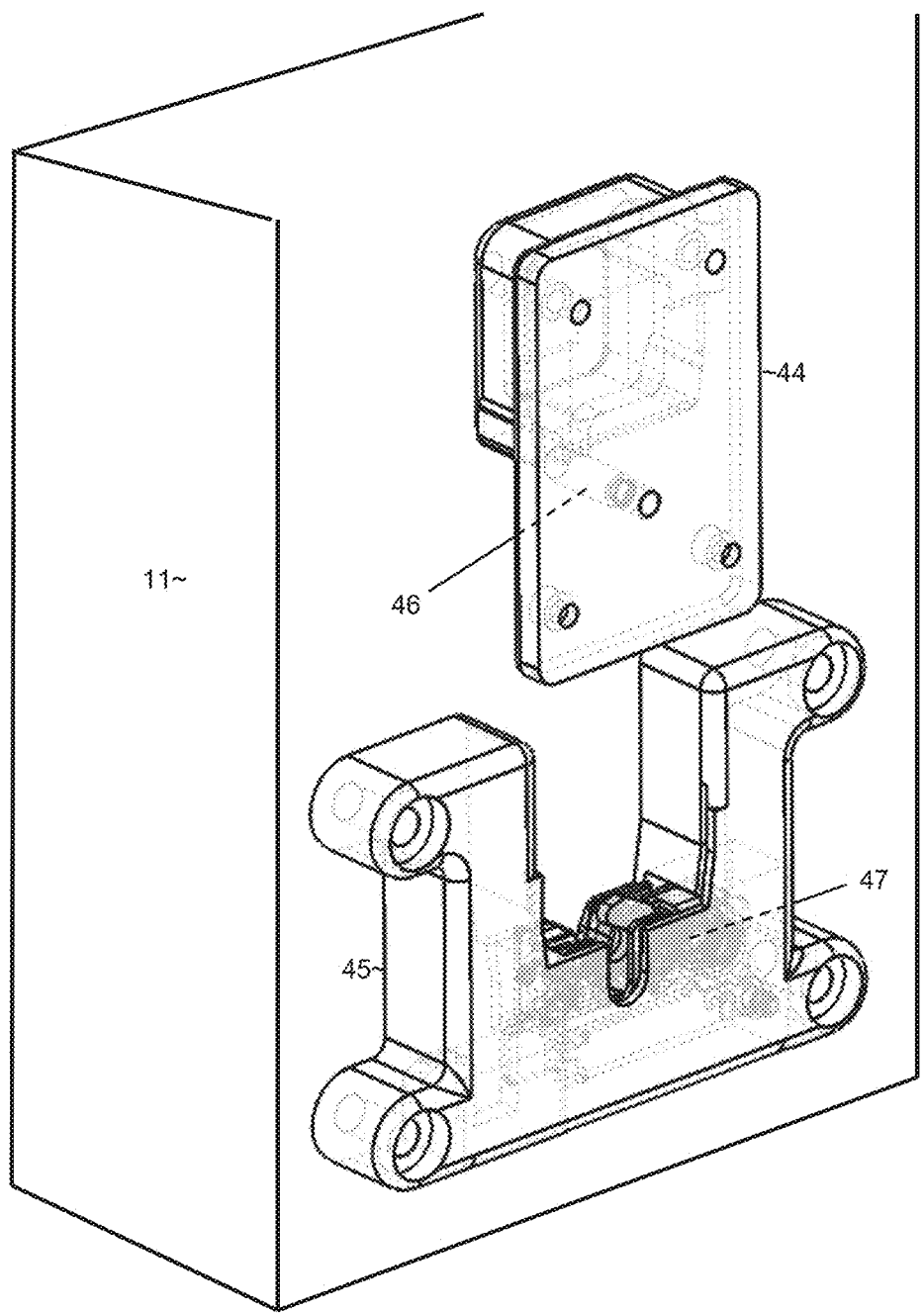
FIG. 4C is another view of the guide piece and the guide illustrated in FIG. 4A according to an exemplary embodiment of the present invention.

FIG. 4C is another view of the guide piece 44 and the guide 45 according to an exemplary embodiment of the present invention. The guide 45 is attached to the antenna 11 and the guide 44 is attached to the remote radio unit 2, which is omitted for clarity. As the remote radio unit 2 moves toward the docking station 20, the guide 45 angles the guide piece 44 so that the remote radio unit 2 can engage with the docking station 20. When the remote radio unit 2 is fully engaged with the docking station 20, the latch 47 secures the bolt 46 in place so to provide a strong mechanical connection and ensures a persistent electrical connection between the remote radio unit 2 and the docking station 20.

Figure 5A:
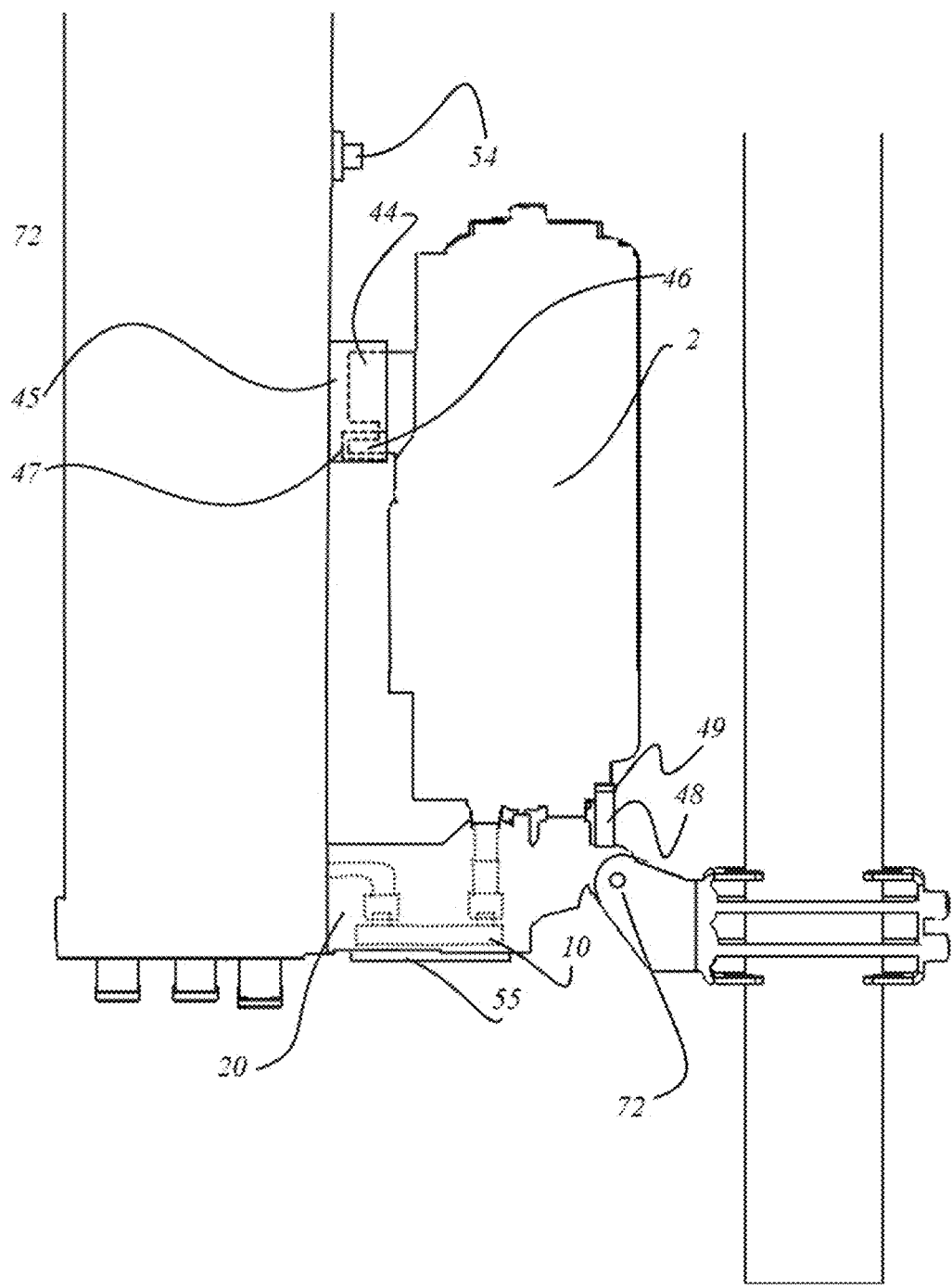
FIG. 5A is a view of the integrated antenna unit illustrated in FIG. 1 according to an exemplary embodiment of the present invention.

FIG. 5A is another view of the integrated antenna unit 1 according to an exemplary embodiment. As shown in FIG. 5A, the remote radio unit 2 is fully installed into its operating position in the docking station 20 with the latch 47 fully engaged with, closed, and secured to the latch hook bolt. The latch 47 is preferably integrated with the guide 45 such that the latch 47 cannot be operated until the remote radio unit 2 has been fully inserted into place. The docking station 20 also includes a latch 48 that engages with a latch hook 49 of the remote radio unit 2.

Closure of the latches 48 provides a clear indication that the remote radio unit 2 is securely fixed in place. The latches 47 and 48 may include microswitches that output a signal indicating that the remote radio unit 2 is locked in place. The signal indicating that the remote radio unit 2 is locked in place may be output to a base station (e.g., via one or more control wires). The signal indicating that the remote radio unit 2 is locked in place may be output to the remote radio unit 2 or the docking station 20, which may transmit the signal to the base station. Alternatively, the signal indicating that the remote radio unit 2 may be output to the base station directly.

Figure 5B:
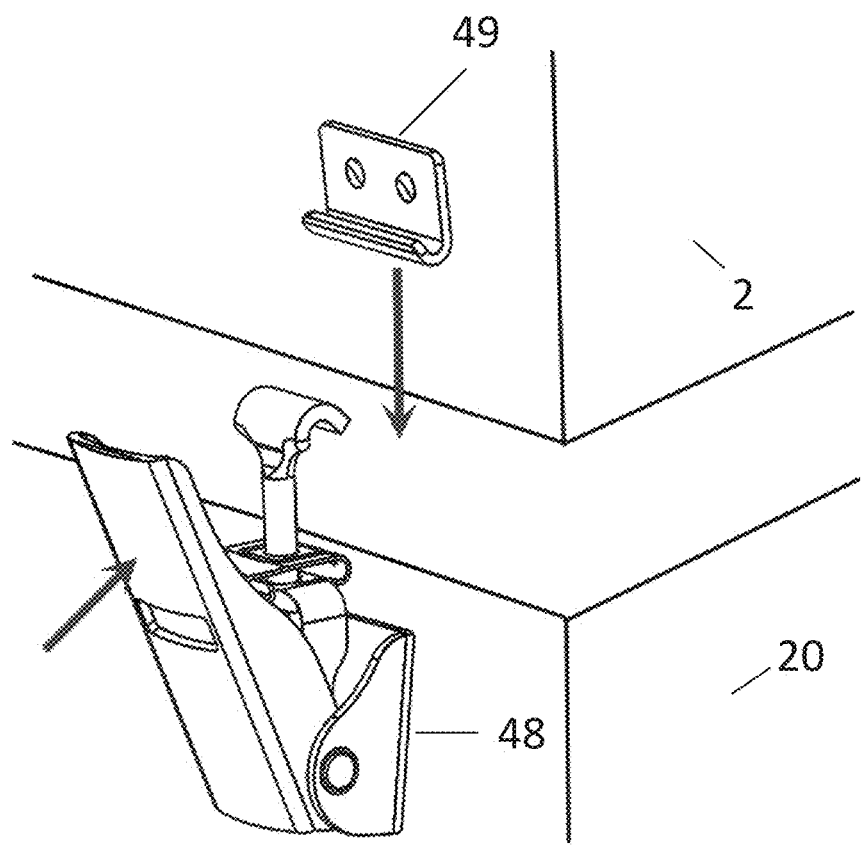
FIG. 5B is a view of the latch and the latch hook illustrated in FIG. 5A according to an exemplary embodiment of the present invention.

FIG. 5B is a view of the latch 48 and the latch hook 49 according to an exemplary embodiment.

As shown in FIGS. 4A-5B, the latch 47 and the bolt 46 as well as the latch 48 and the latch hook 49 provide strong mechanical connections between the remote radio unit 2 and the docking station 20 and antenna 11 and persistent electrical connections between the interfaces 31 and 30 as well as 36 and 35. The strong mechanical connections provided by the latches 47 and 48 reduce the need for the interfaces 30, 31, 35, and 36 to provide a strong and reliable electrical and mechanical connections between the docking station 20 and antenna 11.

To remove the remote radio unit 2, the latches 47 and 48 are released and the remote radio unit 2 is lifted upwards until the remote radio unit 2 disengages from the antenna 11. The latch 47 may be released using the input device 54, which may be connected to the latch 47 by a mechanical linkage or a mechanical control (Bowden) cable.

The transmission circuit 10 may be protected and held in place by a cover plate 55, which may be held in place by fasteners (e.g., threaded or quick-release fasteners).

Figure 6:
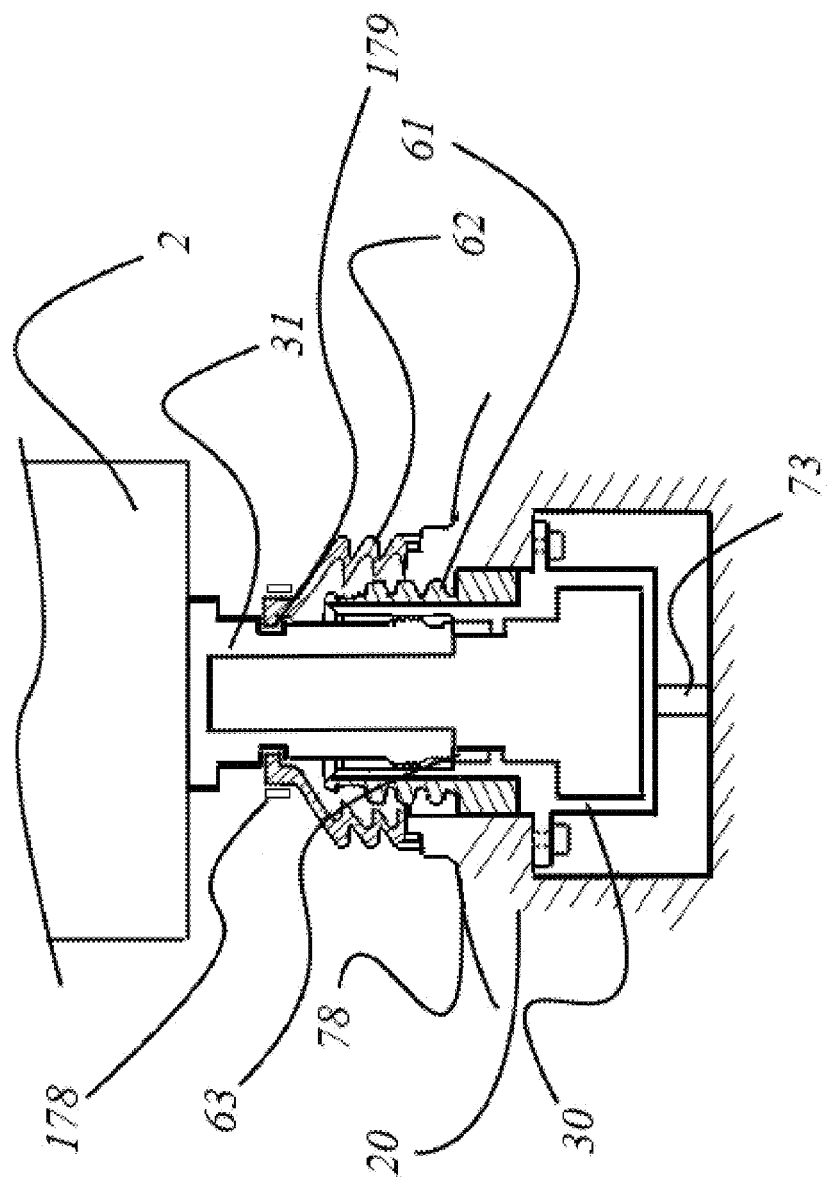
FIG. 6 is a detailed view of a connection between the coaxial interface of the remote radio unit and the coaxial interface of the docking station illustrated in FIG. 1 according to an exemplary embodiment.

FIG. 6 is a detailed view of a connection between the coaxial interface 31 of the remote radio unit 2 and the coaxial interface 30 of the docking station 20 according to an exemplary embodiment.

As shown in FIG. 6, the coaxial interface 31 includes a lower surface 63. The coaxial interfaces 30 and 31 may include an elastomeric sealing device including inner bellows 61 and outer bellows 62. The outer bellows 62 may include an annular groove 179 that may be engaged by a compression clamp 178 (e.g., a worm-drive clamp, a hose clamp, etc.). The docking station 20 has an upper surface 78 that is preferably convex so that moisture is moved away from coaxial interface 30. As described above, the coaxial interface 30 is electrically connected to the transmission line 73. For clarity, the inner conductors of the transmission line 73 and coaxial interfaces 30 and 31 are not shown.

The coaxial interfaces 30 and 31 may be blind mate connectors. The coaxial interfaces 30 and 31 may be self-aligning. The coaxial interfaces 30 and 31 may be elastomerically supported internally such that small variations in radial position, axial position and axial alignment of the remote radio unit 2 and the docking station 20 are accommodated by flexure within the coaxial interfaces 30 and 31 (together with a corresponding flexure of the transmission line 73).

When the remote radio unit is fully engaged and locked into position, the lower surface 63 of the coaxial interface 31 is pressed firmly against the annular contact surface of the coaxial interface 30 such that the current flow encounters negligible electrical non-linearity and the level of generation of passive intermodulation products is well controlled below the required maximum limit.

An elastomeric sealing device (e.g., the inner bellows 61 and the outer bellows 62) may provide a watertight connection. The outer bellows 62 may be held in place on the remote radio unit 2 by a compression clamp 178 around the annular groove 179

Figure 7:
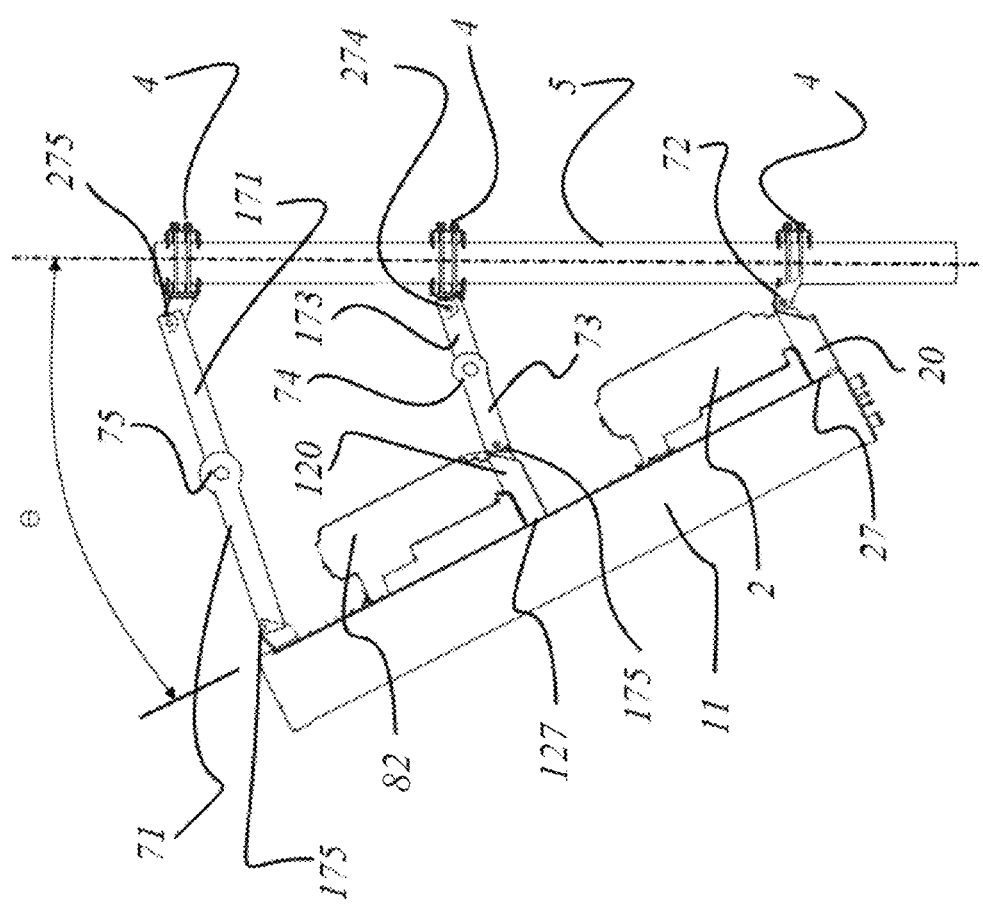
FIG. 7 is a view an integrated antenna unit according to another exemplary embodiment.

FIG. 7 is a view of an integrated antenna unit 1 according to another embodiment. As shown in FIG. 7, the integrated antenna unit 1 may include a first docking station 20 that mechanically attaches and electrically connects to the remote radio unit 2 as described above and a second docking station 120 that mechanically attaches and electrically connects to a second remote radio unit 82. The output of the second remote radio unit 82 may be connected to a second antenna array either in the upper portion of the antenna 11 or occupying the whole length of the antenna 11.

The second docking station 120 includes interfaces similar to the interfaces 24, 25 and 26 described above and additional transmission lines similar to the transmission lines 21, 34, and 74 described above. The second docking station 120 may accommodate at least one additional transmission circuit similar to the transmission circuit 10 described above. Alternatively, the transmission circuit 10 may combine signals output by the remote radio units 82 rather than signals received via the legacy interface 28. In the embodiment shown in FIG. 7, the antenna 11 may have an additional legacy interface similar to the legacy interface 28 that couples to the second antenna array. Similar to the opening 27 described above, the housing of the antenna 11 includes a second opening 127 to accommodate transmission lines between the second antenna array and the second docking station 120. The remote radio units 2 and 82 may output signals in different frequency bands and/or different polarizations.

The antenna 11 may be supported by an upper support device including links 71 and 171 with hinge pins 75, 175, and 275, an intermediate support device including links 73 and 173 with hinge pins 74, 174 and 274, and the hinge pin 72 described above with reference to FIG. 1. The hinge pins 72, 74, 75, 174, 175, 274, 275 are preferably provided with threaded fasteners and washers such that the links 71, 171, 73, and 173 may be locked in place after adjustment. The upper support device and/or the intermediate support device may provide adjustment by which the angle θ between the supporting pole 5 and the vertical axis of the antenna 11 may be adjusted to change the elevation direction of the main beam of radiation (i.e., the mechanical beam-tilt) of the antenna 11. The remote radio unit 2 remains mechanically attached to and electrically connected with the docking station 20 regardless of the angle θ.

Figure 8:
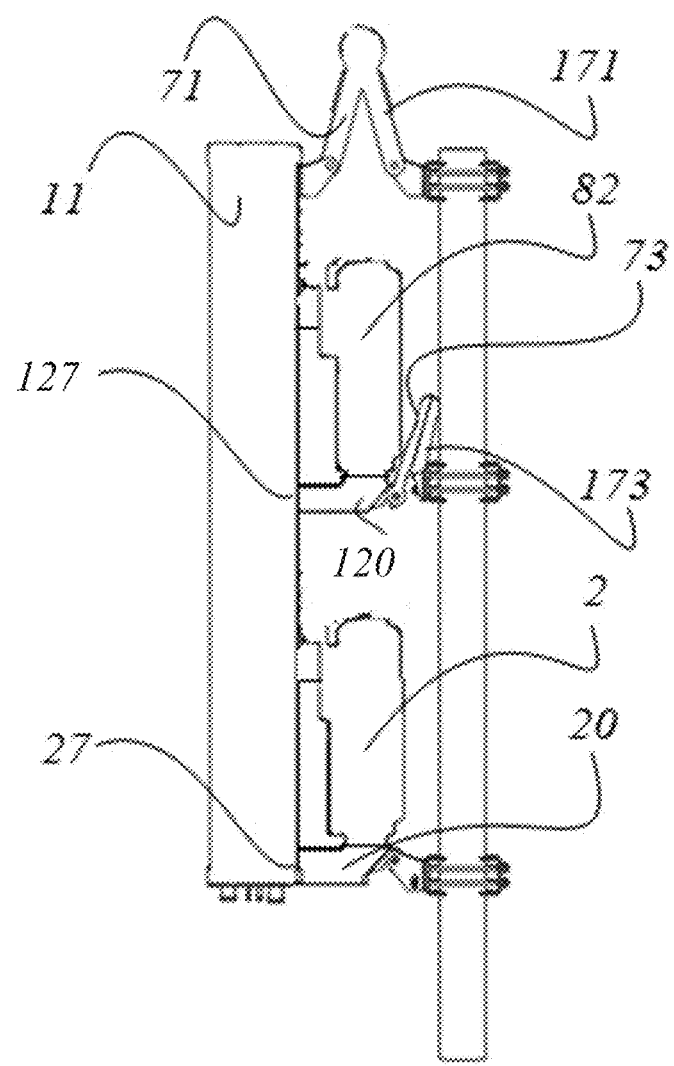
FIG. 8 is a view of the integrated antenna unit illustrated in FIG. 7 according to an exemplary embodiment.

FIG. 8 is a view of the integrated antenna unit 1 illustrated in FIG. 7. As shown in FIG. 8, the antenna 11 may be aligned substantially parallel with the mounting pole 5.

Figure 9:
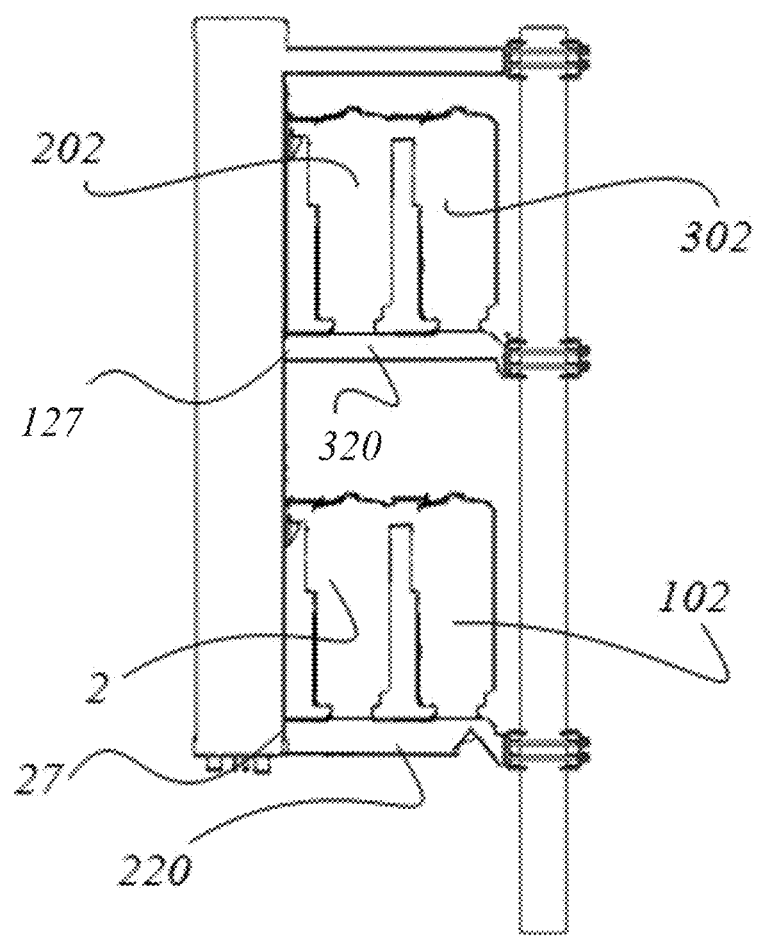
FIG. 9 is a view of an integrated antenna unit according to another exemplary embodiment.

FIG. 9 is a view of the integrated antenna unit 1 according to another exemplary embodiment. As shown in FIG. 9, the integrated antenna unit 1 may include a first docking station 220 that mechanically attaches and electrically connects to two remote radio units 2 and 82 and a second docking station 320 that mechanically attaches and electrically connects to remote radio units 202 and 302. Similar to the opening 27, a second opening 127 is provided in the housing of the antenna 11 to accommodate transmission lines connecting the antenna 11 and the remote radio units 202 and 302. The docking stations 220 and 320 include similar interfaces and transmission lines as the docking stations 20 and 120 described above. The output of the remote radio units 2, 82, 202 and 302 may be electrically connected to four antenna arrays of the antenna 11. The antenna 11 may include multiple independent antenna arrays with up to twelve radio signal inputs. Future development of remote radio units may reduce their size allowing the integrated antenna unit 1 to accommodate additional units. Accordingly, integrated antenna unit 1 may accommodate any number of antenna arrays and/or remote radio units.

The antenna 11 may include any number of antenna arrays, which may transmit and receive signals in any number of frequency bands/polarizations. The docking station 20 may include any number of interfaces and transmission lines to receive signals from any number of remote radio units. The remote radio units may output any number of radio frequency signals in any number of frequency bands/polarizations. For example an integrated antenna unit 1 may (i) output signals received via the legacy interface 28 for transmission by the antenna 11; (ii) combine signals received via multiple legacy interfaces using a combining circuit such as a diplexer and output the combine signals for transmission by the antenna 11; (iii) combine multiple signals output by multiple remote radio units using a combining circuit such as a diplexer and output the combine signals for transmission by the antenna 11; or (iv) combine multiple signals output by a single remote radio unit 2 (via multiple interface) pairs using a combining circuit such as a diplexer and output the combine signals for transmission by the antenna 11.

Figure 10:
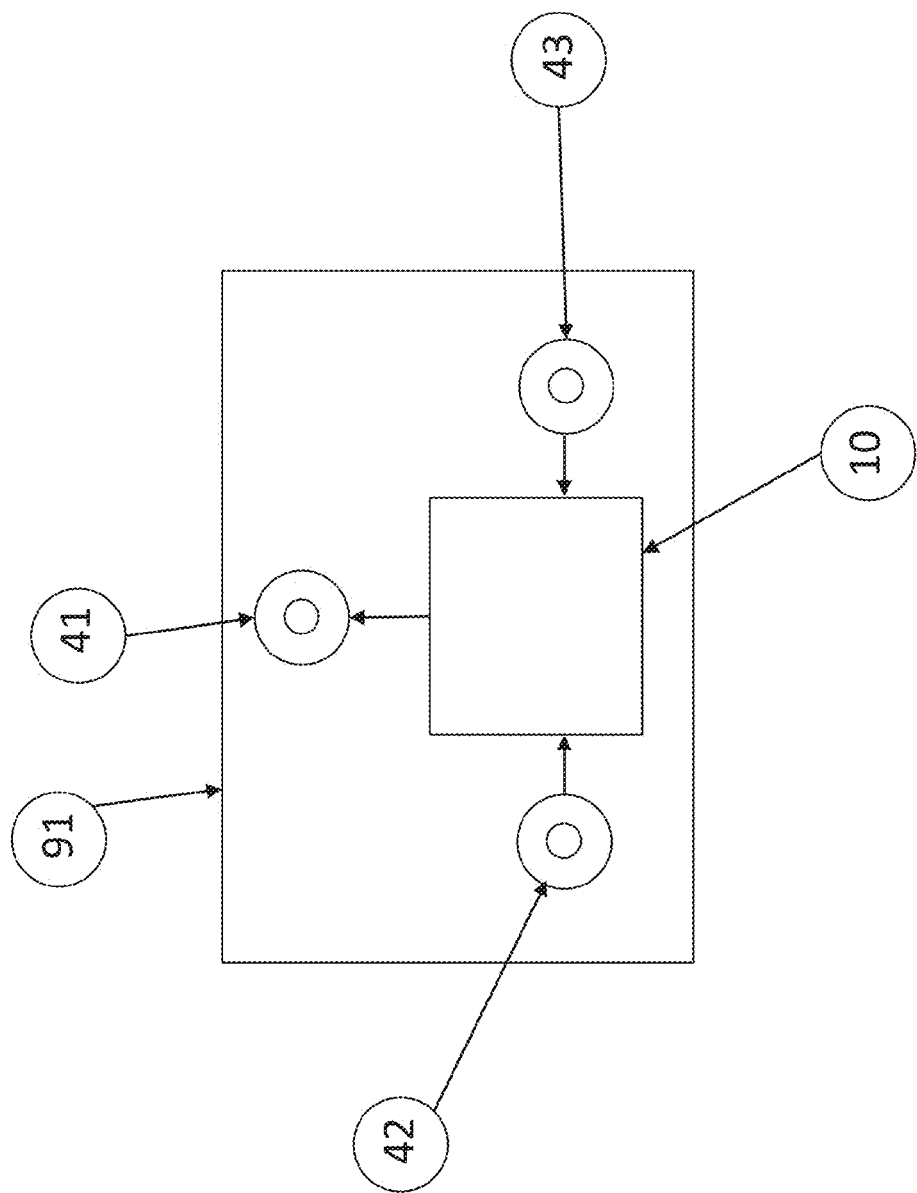
FIG. 10 is a block diagram of the transmission circuit illustrated in FIGS. 1-9 according to an exemplary embodiment.

FIG. 10 is a block diagram of the transmission circuit 10 within a housing 91 according to an exemplary embodiment.

In the embodiment shown in FIG. 10, the transmission circuit 10 is a diplexer including the three interfaces 41, 42, and 43 (preferably blind mate interfaces as described above). The interface 42 receives signals from the legacy interface 28 via the transmission line 21. The interface 43 receives signals from the remote radio unit 2 via the transmission line 73. The diplexer (i.e., the transmission circuit 10) combines the signals received from the legacy interface 28 and the remote radio unit 2 and outputs the combined signals to interface 41 for transmission to the antenna 11 via the transmission line 34.

If the integrated antenna unit 1 receives signals from a remote radio unit 2 and does not receive signals from the legacy interface 28, the diplexer may be replaced by a transmission line connecting the interfaces 41 and 43. Because the transmission line connecting the interfaces 41 and 43 may have the same interface positions as the diplexer, the transmission mode of the integrated antenna unit 1 may be changed by simply exchanging the diplexer for the transmission line connecting the interfaces 41 and 43.

If the integrated antenna unit 1 receives signals via the legacy interface 28 and is not fitted with a remote radio unit 2, the diplexer may be replaced by a transmission line connecting the interfaces 41 and 42. Because the transmission line connecting the interfaces 41 and 42 may have the same interface positions as the diplexer, the transmission mode of the integrated antenna unit 1 may be changed by simply exchanging the diplexer for the transmission line connecting the interfaces 41 and 42.

The transmission circuits 10 (e.g., diplexers, transmission lines, etc.) may be field replaceable. Because the antenna 11 and the docking station 20 are extra-wideband devices, operators may deploy the integrated antenna units 1 globally. An operator can add or change the operating frequency band(s) of the integrated antenna unit 1 by de-mountably installing and/or exchanging the remote radio unit and diplexer instead of installing a new antenna or replacing an existing antenna with a different antenna.

While the inventive concept has been particularly shown and described with reference to exemplary embodiments thereof, they are provided for the purposes of illustration, and it will be understood by those of ordinary skill in the art that various modifications and equivalent other embodiments can be made from the inventive concept. Accordingly, the scope of the inventive concept should be defined by the appended claims.

What is claimed is:

1. An integrated antenna unit, comprising:
an antenna having a legacy interface for receiving signals from a base station;
a removable remote radio unit having a first electrical interface; a docking station having a second electrical interface that electrically couples with the first electrical interface of the removable radio unit, the docking station configured to electrically couple the removable remote radio unit and the antenna, said docking station comprising a third electrical interface, a fourth electrical interface, a fifth electrical interface and a first transmission line that electrically couples the second electrical interface and the third electrical interface; a second transmission line that electrically couples the fourth electrical interface and the antenna; a transmission circuit that electrically coupled the third electrical interface and the fourth electrical interface and a third transmission line electrically coupling the legacy interface and the fifth electrical interface wherein the docking station is configured to receive a removable diplexer that electrically coupled the third interface, the fourth electrical interface and the fifth electrical interface.

2. The integrated antenna unit of claim 1, wherein the transmission circuit is removable.

3. The integrated antenna unit of claim 1, wherein the first electrical interface and the second electrical interface are demountable interfaces.

4. The integrated antenna unit of claim 3, wherein the first electrical interface and the second electrical interface are push fit connectors.

5. The integrated antenna unit of claim 3, wherein the first electrical interface and the second electrical interface are blind mate connectors.

6. The integrated antenna unit of claim 1, wherein the removable remote radio unit includes guide piece and the antenna includes a guide configured to receive the guide piece when the removable remote radio unit is electrically coupled to the second electrical interface of the docking station.

7. The integrated antenna unit of claim 1, wherein the removable remote radio unit includes a bolt and the antenna includes a latch that engages with the bolt and holds the remote radio unit in place when the removable remote radio unit is electrically coupled to the second electrical interface of the docking station.

8. The integrated antenna unit of claim 1, wherein the removable remote radio unit includes a latch hook and the docking station includes a latch that engages with the latch hook and holds the remote radio unit in place when the removable remote radio unit is electrically coupled to the second electrical interface of the docking station.

9. The integrated antenna unit of claim 1, farther comprising at least one switch configured to determine whether the removable remote radio unit is electrically coupled to the docking station and output an indication that that the removable remote radio unit is electrically coupled to the docking station for transmittal to a base station.

10. The integrated antenna unit of claim 1, wherein the removable remote radio unit is configured to output control signals via a first control signal interface and the docking station is configured to receive the control signals via a second control signal interface and output the control signals to the antenna via a control signal transmission line.

11. The integrated antenna unit of claim 1, wherein a housing of the antenna forms an outer surface of the antenna and the docking station and includes an opening to accommodate the second transmission line.

12. The integrated antenna unit of claim 1, wherein the first transmission line and the second transmission line are coaxial transmission lines.

13. The integrated antenna unit of claim 1, wherein the first transmission line and the second transmission line have a substantially planar geometry.

14. The integrated antenna unit of claim 1, wherein the docking station has an additional electrical interface for electrically coupling to an additional removable remote radio unit.

15. The integrated antenna unit of claim 14, wherein the antenna comprises a first antenna array electrically coupled to the second transmission line and a second antenna array electrically coupled to the additional removable remote radio unit via an additional transmission line.

16. The integrated antenna unit of claim 1, further comprising an additional docking station including an additional electrical interface for electrically coupling to an additional removable remote radio unit.

17. The integrated antenna unit of claim 16, wherein the antenna comprises a first antenna array electrically coupled to the second transmission line and a second antenna array electrically coupled to the additional removable remote radio unit via an additional transmission line.

18. The integrated antenna unit of claim 1, wherein the antenna is configured to transmit radio frequency signals across a first frequency band and the removable remote radio unit is configured to output signals for transmission over a second frequency band within the first frequency band.

19. The integrated antenna unit of claim 1, wherein the diplexer combines signals output by the removable remote radio unit and signals received via the legacy interface to form a combined signal and outputs the combined signal to the antenna.

20. The integrated antenna unit of claim 19, wherein:
the signals output by the removable radio unit are received by the diplexer via the first electrical interface, the second electrical interface, the first transmission line, and the third electrical interface;
the signals received via the legacy interface are output to the diplexer via the fifth electrical interface and the third transmission line; and
the combined signal is output to the antenna via the fourth electrical interface and the second transmission line.

21. The integrated antenna unit of claim 20 wherein the docking station is further configured to receive a second removable transmission circuit that electrically couples the fifth electrical interface and the fourth electrical interface to electrically couple the legacy interface and the antenna.

* * * * *